United States Patent [19]

Molleker et al.

[11] Patent Number: 5,044,245
[45] Date of Patent: Sep. 3, 1991

[54] ROTARY PRECISION CIRCLE CUTTER

[75] Inventors: Daniel Molleker, Bothell, Wash.; David H. Klempel, Plains, Mont.

[73] Assignee: Artistic Photo Plate Creations, Inc., S.E. Bothell, Wash.

[21] Appl. No.: 542,323

[22] Filed: Jun. 22, 1990

[51] Int. Cl.$^5$ .......................... B26D 3/08; B26D 1/02
[52] U.S. Cl. ..................................... 83/886; 83/410.9; 83/522.15; 83/699; 83/733; 83/856; 33/27.07; 82/101; 82/123
[58] Field of Search ................. 83/410.7, 410.8, 410.9, 83/439, 522.15, 522.16, 522.17, 522.18, 522.19, 699, 733, 856, 879, 886, 887; 33/27.07, 82/101, 123, 158

[56] References Cited

U.S. PATENT DOCUMENTS

| | | | |
|---|---|---|---|
| 308,466 | 11/1884 | Claflin | 33/27.07 |
| 1,051,689 | 1/1913 | Coleman | 33/27.07 |
| 3,621,574 | 11/1971 | Yanke et al. | 30/290 |
| 3,797,543 | 3/1974 | Schell | 144/145 |
| 4,021,025 | 5/1977 | Frame | 266/58 |
| 4,120,220 | 10/1978 | Mullen | 83/886 |
| 4,233,736 | 11/1980 | Duggins et al. | 30/293 |
| 4,407,074 | 10/1983 | Ledbetter | 33/27.07 X |
| 4,437,376 | 3/1984 | Flint | 83/886 |
| 4,662,073 | 5/1987 | Prusman | 33/27.11 |
| 4,790,222 | 12/1988 | Morgan | 82/1.3 |
| 4,878,409 | 11/1989 | Carithers, Jr. | 83/466 |
| 4,916,820 | 4/1990 | Kozyrski et al. | 83/886 X |

OTHER PUBLICATIONS

"Artisitc Photo Plate Creations, Inc. Presents the Ultra 3000 System/A Tremendous Opportunity", Artistic Photo Plate Creations, Inc., Bothell, Wash., 98021.
Oval/Circle Mat Cutters, Straight Edge Mat Kit, Oval Mat Kit, and EZ Hand Mat Cutter, Leichtung Workshop, Inc. (Cleveland, Ohio).

Primary Examiner—Frank T. Yost
Assistant Examiner—Eugenia A. Jones
Attorney, Agent, or Firm—Steven J. Hultquist

[57] ABSTRACT

A rotary precision circle cutter device, wherein the material to be cut is placed on a table which is rotatably mounted on a base, and cut by a cutting implement attached to an articulated cutter arm assembly mounted on the base. The articulated cutter arm assembly movably extends over the rotatable table in a direction generally perpendicular to the axis of rotation of the table, with the cutting implement being securable in any of a plurality of positions along the radius of the table by movement of the articulated cutting arm. In a preferred embodiment, the rotatable table is mounted on a swing arm to allow the rotatable table to move with respect to the base, and detachably mounted template cams are employed, which rotate conjointly with the table and a template-cam engaging bearing, such that the axis of rotation of the table can be displaced with respect to the cutter arm to trace a shape congruent with the shape of the template can during conjoint rotation of the table and template cam.

20 Claims, 2 Drawing Sheets

ROTARY PRECISION CIRCLE CUTTER

BACKGROUND OF THE INVENTION

1. Field of the Invention

This invention relates generally to devices for cutting or scribing circles and other shaped forms onto material, especially devices which support the material to be cut on an integrally mounted table. Such devices can typically be used for cutting or drawing on photographs, paper, cloth, plastics, glass, metal, or similar thin sheet material, but the invention is not restricted to such applications.

2. Description of the Prior Art

Several types of devices for cutting shapes in photographs, photo mats, or similar materials have been employed in the art. One rotary cutter device for making only circular cuts in photographs or similar materials has been marketed for several years by Artistic Photo Plate Creations, Inc. of 120 W. Dayton Street, Suite A-2, Edmonds, Wash. 98020. This rotary cutter device employs a circular stand with a rotatable table mounted to the center of the stand. There is additionally an arm extending outwardly and upwardly from the stand which in turn supports a beam member disposed over the table. A cutting implement can be mounted on that beam member and slidably moved to various positions along that beam member over the rotatable table. The beam member always overlies the table in the same position regardless of the position of the cutting implement or the desired size of the circle to be cut.

Other devices for cutting circular or oval shapes in photographic mats or similar materials have been marketed by Leichtung Workshop, Inc. of 4944 Commerce Drive, Cleveland, Ohio 44128, in systems that involve securing the device on the object to be cut and having a cutter arm rotate about the device to make a circular cut, or that make use of a peg and guide system to have the device make an oval cut. These devices are marketed by Leichtung as the Oval/Circle Mat Cutters, Straight Edge Mat Kit, Oval Mat Kit, or the EZ Hand Mat Cutter.

Additionally, several patents pertain to devices similar to the ones noted above. For example, U.S. Pat. No. 3,621,574 teaches a photographic print circle cutter consisting of a central disc on which is mounted a rotatable arm with a cutting implement that can be adjusted to follow any of a number of circular patterns at various radii from the center. This device, however, requires that the disc be placed on top of or adjacent to the material to be cut so that the axis of rotation of the cutter arm is over the center of the circular shape of the material to be cut.

U.S. Pat. No. 4,233,736 teaches a pressure sensitive picture frame mat cutter which focuses primarily on a pressure sensitive adjustment for the cutting implement to control the depth of the cut in a picture frame mat. This device, through a cable attached thereto used in conjunction with pins placed on the material to be cut, can inscribe circular, oval, or other shapes on the material to be cut.

U.S. Pat. No. 4,790,222 teaches an apparatus for cutting various forms out of a picture frame mat, and is based upon an adaptation of a mechanism known as the "Oval Master," manufactured by C & H Manufacturing Company of Jackson, Miss.; this patent teaches a system of gears, chains, and attachments to the Oval Master device to allow reciprocating motion of an arm attached to the cutting implement to form irregular or scalloped shapes on circular, oval, or other shapes outlined by the device.

Similar devices can be used in different applications, such as appear in U.S. Pat. No. 4,021,025, a circle cutter particularly adapted to be used to position a welding or cutting implement to trace a circular shape. This device requires placement onto the material on which the cut is to be made.

U.S. Pat. No. 3,797,543 teaches a material shaping platform with multiple or exchangeable templates, a rotatable platen mounted to a mechanism allowing reciprocating movement in accordance with the engagement of template cams with the rotating mechanism for the shaft of the rotatable platform. This device does not have any provision for an integrally attached mechanism for supporting and positioning a cutting implement.

U.S. Pat. No. 4,120,220 teaches a stationary cutter device which can secure a cutting implement and under which glass or similar materials to be inscribed may be moved.

Of general background interest is U.S. Pat. No. 4,662,073, which teaches an infinitely variable drawing instrument involving connected arms moved by gearing mechanisms to draw shapes on materials mounted on a rotary platform.

The disadvantage inherent in many of these prior art inventions is that they require placement of the cutting or scribing device on the material to be worked upon. The present invention allows the material to be worked upon to be placed on the rotatable table with the shape being made on the material by the single point of the cutting or scribing implement bearing against the material, which is supported by the platen. While the prior art marketed by Artistic Photo Plate Creations, Inc. of Bothell, Wash. provides a platform supporting the material with only the single point of the cutting implement contacting the face of the photograph or similar material, it has the disadvantage of having a beam member hanging over the rotatable table at all times that the cutting implement is in use, with that beam member always being in the same position regardless of the radius of the cut being made. The present invention allows for an articulated cutter arm which can be adjusted to overlie the platen only as far as necessary to have the cutting implement make contact with the material at the point the incision is to be made, thereby allowing a clear view of the material and the cut being made and thus providing conditions for finer control of the cutting process.

SUMMARY OF THE INVENTION

The present invention relates generally to a rotary precision circle cutter device. The material to be cut is placed on a table which is rotatably mounted on a base. The material is cut by a cutting implement such as a blade or stylus; this cutting implement is attached to an articulated cutter arm assembly mounted on the base and which movably extends over the rotatable table in a direction generally perpendicular to the axis of rotation of the table. The cutting implement can be secured in any of a plurality of positions along the radius of the table by movement of the articulated cutting arm.

The invention cuts precision circular shapes of various diameters. The axis of rotation of the table is fixed with respect to the base, and once the position of the articulated cutter arm is set, the cutting implement inscribes a cut on the material at a fixed distance along the radius of the table as it rotates.

Other aspects and features of the invention will be more fully apparent from the ensuing disclosure and claims.

BRIEF DESCRIPTION OF THE DRAWINGS

Figure One is an upper front perspective view of the entire rotary precision cutter device showing the base, articulated cutter arm assembly, and rotatable table.

Figure Two is an upper front perspective view of the table and related mounting assembly on the base.

Figure 1:
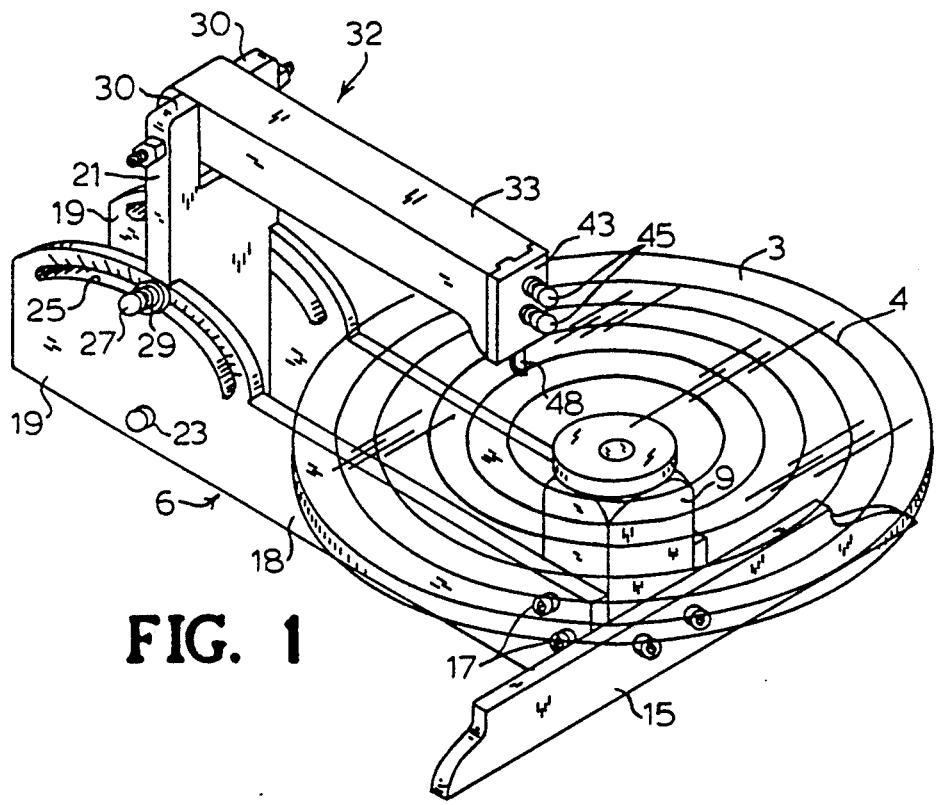
Figure 2:
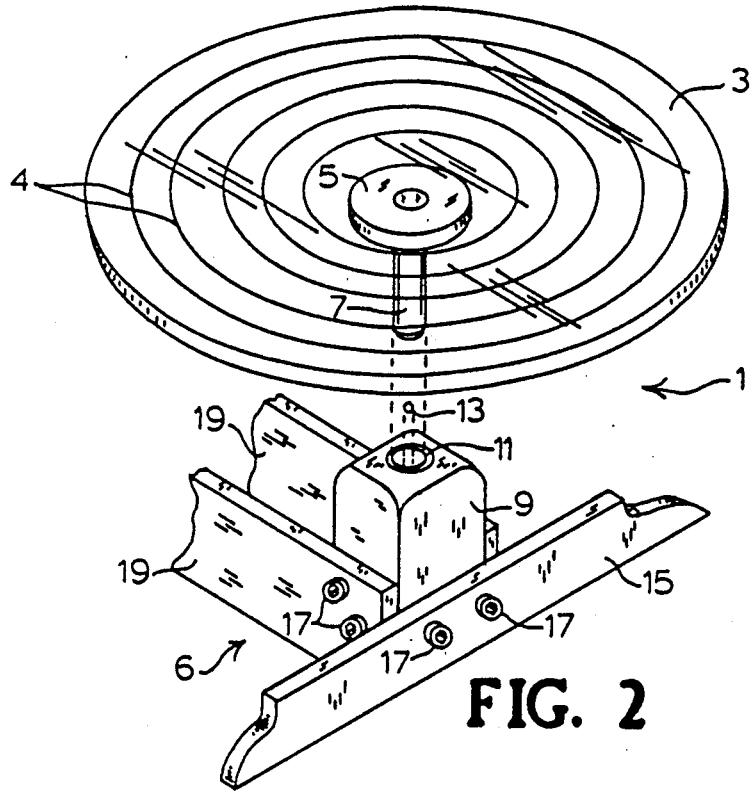
Figure 3:
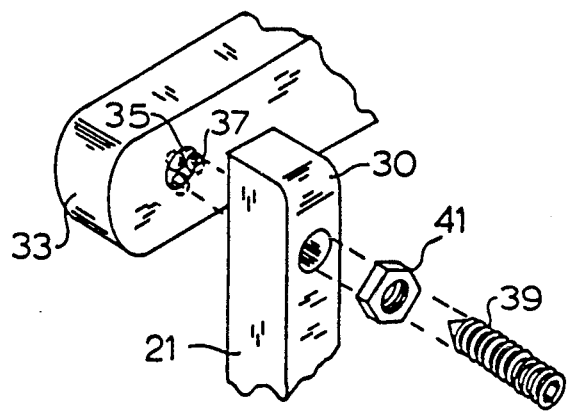

Figure Three is an exploded perspective view of the pivotal attachment of the main cutter arm to the support arm.

DETAILED DESCRIPTION OF THE INVENTION, AND PREFERRED EMBODIMENTS THEREOF

The disclosed invention provides a precise means of making circular cuts in materials.

Referring to Figures One and Two, an articulated cutter arm assembly 32 is attached to base 6. The base may be of any shape that provides suitable support for the components of the invention described below. An elongate base is shown in Figure One.

The base 6 rotatably supports a table on which the material to be cut is placed. Such table may be of any suitable size or shape to present the material to be worked upon and may be a platen 3 as shown in the drawings. The articulated cutter arm 32 positions cutting or scribing implement 48 over platen 3 on which the material to be worked upon (not shown) is placed.

Referring to Figure One, the cutter device comprises base 6 which comprises main base plates 19, transverse arm 15, and platen support housing 9 integrally attached together by mechanical fasteners 17, or equivalent attachment means The base 6 can be of any form or construction that provides an acceptable platform to support platen 3 and articulated cutter arm assembly 32. In the embodiment presented in Figure One the main base plates 19 and transverse arm 15 are joined together in substantially a "T" shape.

Base 6 has elongated main section 18 formed by two parallel main base plates 19. Support arm 21 movably fits between the parallel main base plates 19 and is rotatably mounted therebetween by screw fasteners 23 inserted through main base plates 19 into threaded apertures in support arm 21 positioned to allow the support arm to rotate about its lower end. Support arm 21 is further securable in a selected orientation by thumb screw fasteners 27 and washers 29, or similar means, extending inwardly through arcuate shaped guide slots 25 in main base plates 19 into threaded apertures in support arm 21. Fasteners 27 can be used to secure the position of support arm 21 at a position anywhere along the guide slot 25 as support arm 21 rotates about the axis of the fasteners 23 securing support arm 21 to the base 6.

Cutter arm 33 is pivotally supported on the distal end of support arm 21 from the base 6. Distal end of support arm 21 comprises two prongs 30 with a space therebetween into which cutter arm 33 fits. As appears in Figure Three, externally threaded screw fastener 39 with a conical tip is threaded through threaded apertures in prongs 30 of support arm 21 to engage cutter arm 33.

Cutter arm 33 on each side adjacent to the threaded apertures in prongs 30 has a cavity 35 alignable with threaded apertures in prongs 30. Each cavity 35 has positioned therein a plurality of ball bearings 37 disposed to receive therebetween the conical tip of fastener 39. Nuts 41 are threaded onto fasteners 39 to lock fastener 39 in a position along its axis of travel. Fasteners 39 are threadably advanced through threaded apertures in prongs 30 until the conical tip of the fastener contacts ball bearings 37, thereby allowing free pivotal motion of cutter arm 33 about support arm 21.

Mounting plate 43 is detachably securable by suitable means, such as screw fasteners 45, to main cutter arm 33 at its end opposite the support arm 21. Such frontal end of the cutter arm 33 has a slot therein (not shown) of a size and shape suitable for receiving cutting or scribing implement 48. Cutting or scribing implement 48 may be of any type or shape suitable for the work to be done on the material placed on the platen 3. For example, implement 48 may be a cutting blade. Cutting implement 48 is attached to the end of cutter ar 33 when plate 43 is securely attached to end of said cutter arm by fasteners 45, clamping the cutting blade or mounting shaft of the cutting implement therebetween. Cutter arm 33, rotating about support arm 21, can be positioned so that cutting or scribing implement 48 contacts the material on platen 3 to be worked upon.

Rotatable platen 3, which may have marked thereon various concentric circles 4 with numbers indicating the radii of the circles from the center of the platen, has firmly attached to it on one side in its center by a suitable means, such as an adhesive, platen mounting base $ which has an axle 7 depending therefrom. Platen 3 is desirably constructed of glass or other material suitable to support the material to be worked upon. Platen support housing 9 is bored to receive brass bushing 11 press fit into the bored bushing cavity, the bushing being of a size adapted to receive the axle 7 depending from the platen mounting base. To facilitate ease of rotation, a ball bearing 13 is inserted into a depression at the center of the bottom of the bushing cavity thereby positioning the ball bearing 13 to provide the vertical support for mounting base axle 7 after it is inserted through bushing 11.

To cut a shape on a suitable material using the invention, support arm 21 is positioned along guide slot 25 to place the cutting or scribing implement 48 at the end of cutter arm 33 at a desired position along the radius of platen 3. Positioning of the end of cutter arm 33 can be aided by any suitable indexing means on the device. By way of example and not limitation, such indexing device may comprise a registration mark inscribed on the side of support arm 21 and registration marks inscribed along the edge of guide slot 2$ so that the position of cutter arm 33 along the radius of platen 3 may be read from the registration mark along guide slot 25 adjacent to the registration mark on support arm 21. Support arm 21 can be securely fastened in the selected position by thumb screws 27 to secure its position along the guide slot. As the platen is rotated the cutting implement 48 works upon the material on the platen, making a precise circular cut at a selected radius from the center of the platen 3.

When the desired work has been done on the material on the platen, the cutter arm 33 may be lifted and the material removed from the platen.

The rotary cutter device may be constructed of any material of suitable strength, including, but not limited to, steel, cast iron, aluminum, brass, or plastic.

The cutting or scribing implement can be any type of tool to cut, inscribe, or draw upon the material to be worked upon. Although the drawings accompanying this disclosure reflect blades and other cutting tools, the utility of the invention is not so limited. As used in this application, the words "cut" or "cutting" are to be construed to include all cutting, drawing, or other implements that might be attached to the cutter arm for the purpose of working on the material placed on the platen. Such tools would include, but not be limited to, blades, styli, pencils, pens, or similar instruments efficacious for performing the desired work on the material. The material to be worked upon could be cut, shaped, impressed, or drawn upon by such cutting or scribing implement. Examples of materials that might be worked upon by this invention include paper, photographs, film stock, plastics, gasket material, rubber, glass, metals, and other thin sheet material.

While the invention has been described with reference to the two embodiments noted above, it will be appreciated that other variations, modifications, embodiments are possible, and accordingly all such variations, modifications, and embodiments are to be regarded as being within the spirit and scope of the invention as claimed.

What is claimed is:

1. A rotary cutter apparatus, comprising:
   a base including a rotatable table mount;
   a rotatable table positionable on said mount and rotatable thereon about an axis of rotation;
   an articulated cutter arm assembly, comprising
      a main cutter arm; and
      a support arm having first and second ends, with the first end being pivotally mounted on the base for pivotal movement about a first pivotal axis, and the second end being pivotally connected to the main cutter arm for pivotal movement about a second pivotal axis, such that the main cutter arm is translatable along a direction generally perpendicular to the axis of rotation of the rotatable table, with the first pivotal axis and the second pivotal axis of the support arm being parallel to one another; and
   means for detachably securing a cutting implement to a portion of the main cutter arm overlying the rotatable table.

2. A rotary cutter apparatus according to claim 1, wherein: said base comprises an elongated main section with distal and proximal ends, with the distal end of the elongated main section having a guide slot therein; and
   said apparatus has fastening means cooperatively engaging said guide slot and said support arm, such that said support arm is securable thereby in a selected orientation in any of a plurality of positions along said guide slot.

3. A rotary cutter apparatus according to claim 2, wherein said support arm has at least one threaded aperture therein which is alignable with said guide slot, and said fastening means comprises at least one screw fastener extending inwardly through said guide slot and threadably engaging a said threaded aperture in said support arm aligned therewith, said screw fastener being selectively tightenable to securely position said support arm in said selected orientation, and selectively loosenable to allow translation of said support arm, and movement of said screw fastener along said guide slot, to another selected orientation of the support arm.

4. A rotary cutter apparatus according to claim 2 wherein said guide slot is arcuate-shaped.

5. A rotary cutter apparatus according to claim 2, wherein said apparatus has indexing means to indicate the position of said cutting implement with respect to said rotatable table.

6. A rotary cutter apparatus according to claim 5, wherein said indexing means comprises said guide slot having a scale comprising registration marks associated therewith and said support arm has a registration mark thereon which is positionably alignable with said scale to indicate the position of said cutting implement with respect to said rotatable table.

7. A rotary cutter apparatus according to claim 1, wherein:
   said rotatable table comprises a platen having top and bottom surfaces, and a spindle attached to said bottom surface of said platen and depending downwardly therefrom, said spindle being positionable in said rotatable table mount for rotation of the table.

8. A rotary cutter apparatus according to claim 7, wherein said platen is of circular shape and has marked thereon concentric circles about the center of said platen with associated numbers indicating the radii of said concentric circles from the center of said platen.

9. A rotary cutter apparatus according to claim 1, wherein said main cutter arm includes a slotted surface therein, and said means for detachably securing a cutting implement to said main cutter arm comprises a mounting plate which is detachably securable to said cutter arm in a position overlying said slotted surface to clamp the cutting implement therebetween.

10. A rotary cutter apparatus according to claim 1, wherein said second end of said support arm comprises two prongs in spaced relationship to one another to receive said main cutter arm therebetween, with said prongs each having a threaded aperture therethrough for threadably engaging therein an externally threaded screw having a conical tip, and said main cutter arm having a cavity alignable with the threaded aperture in each of said prongs to receive a said externally threaded screw which is threaded through said aperture, with each cavity in said main cutter arm having positioned therein a plurality of ball bearings which contact the conical tip of a said externally threaded screw when said screw is threadably advanced into the cavity, whereby said main cutter arm is fastenable to said support arm to accommodate free pivotal motion of said main cutter arm relative to said support arm.

11. A rotary cutter apparatus according to claim 1, wherein the base is T-shaped.

12. A rotary cutter apparatus according to claim 1, wherein the rotatable table mount comprises a support housing containing a bushing, and the rotatable table comprises an axle positionable in said bushing and rotatable therein.

13. A rotary cutter apparatus, comprising:
   (a) a base including a rotatable table mount, said base comprising an elongated main section with distal and proximal ends, and a transverse section joined at a medial portion thereof to the proximal end of the elongated main section, such that the base has substantially a "T" shape, with the distal end of the elongated main section having a guide slot therein;

(b) a rotatable table positionable on said mount and rotatable thereon about an axis of rotation, said rotatable table comprising a platen having top and bottom surfaces, and a spindle attached to said bottom surface of said platen and depending downwardly therefrom, said spindle being positionable in said rotatable table mount for rotation of the table;

(c) an articulated cutter arm assembly, comprising:
a main cutter arm; and
a support arm having first and second ends, with the first end being pivotally mounted on the base, and the second end being pivotally connected on the main cutter arm such that the main cutter arm is translatable along a direction generally perpendicular to the axis of rotation of the rotatable table;

(d) said apparatus has fastening means cooperatively engaging said guide slot and said support arm, such that said support arm is securable thereby in a selected orientation in any of a plurality of positions along said guide slot; and (e) means for detachably securing a cutting implement to a portion of the main cutter arm overlying the rotatable table, with said main cutter arm including a slotted surface therein, and said means for detachably securing a cutting implement to said main cutter arm comprising a mounting plate which is detachably securable to said cutter arm in a position overlying said slotted surface to clamp the cutting implement therebetween.

14. A rotary cutter apparatus according to claim 13, wherein said support arm has at least one threaded aperture therein which is alignable with said guide slot, and said fastening means comprises at least one screw fastener extending inwardly through said guide slot and threadably engaging a said threaded aperture in said support arm aligned therewith, said screw fastener being selectively tightenable to securely position said support arm in said selected orientation, and selectively loosenable to allow translation of said support arm, and movement of said screw fastener along said guide slot, to another selected orientation of the support arm.

15. A rotary cutter apparatus according to claim 13, wherein said guide slot is arcuate-shaped.

16. A rotary cutter apparatus according to claim 13, wherein said apparatus has indexing means to indicate the position of said cutting implement with respect to said rotatable table.

17. A rotary cutter apparatus according to claim 16, wherein said indexing means comprises said guide slot having a scale comprising registration marks associated therewith and said support arm has a registration mark thereon which is positionably alignable with said scale to indicate the position of said cutting implement along the radius of said platen corresponding to the selected orientation of said support arm.

18. A rotary cutter apparatus according to claim 13, wherein said second end of said support arm comprises two prongs in spaced relationship to one another to receive said main cutter arm therebetween, with said prongs each having a threaded aperture therethrough for threadably engaging therein an externally threaded screw having a conical tip, and said main cutter arm having a cavity alignable with the threaded aperture in each of said prongs to receive a said externally threaded screw which is threaded through said aperture, with each cavity in said main cutter arm having positioned therein a plurality of ball bearings which contact the conical tip of a said externally threaded screw when said screw is threadably advanced into the cavity, whereby said main cutter arm is fastenable to said support arm to accommodate free pivotal motion of said main cutter arm relative to said support arm.

19. A rotary cutter apparatus according to claim 13, wherein said platen is of circular shape and has marked thereon concentric circles about the center of said platen with associated numbers indicating the radii of said concentric circles from the center of said platen.

20. A rotary cutter apparatus, comprising:
(a) a base including a rotatable table mount, the base comprising an elongated main section with distal and proximal ends, and a transverse section joined at a medial portion thereof to the proximal end of the elongated main section thereof, such that the base has substantially a "T" shape, with the distal end of the elongated main section having a guide slot therein;

(b) a rotatable table positionable on said mount and rotatable thereon about an axis of rotation, said rotatable table comprising a platen having top and bottom surfaces, and a spindle attached to said bottom surface of said platen and depending downwardly therefrom, said spindle being positionable in said rotatable table mount for rotation of the table;

(c) an articulated cutter arm assembly, comprising:
a main cutter arm; and
a support arm having first and second ends, with the first end being pivotally mounted on the base for pivotal movement about a first pivotal axis, and the second end being pivotally connected to the main cutter arm for pivotal movement about a second pivotal axis, such that the main cutter arm is translatable along a direction generally perpendicular to the axis of rotation of the rotatable table, with the first pivotable axis and the second pivotal axis of the support arm being parallel to one another;

(d) said apparatus has fastening means cooperatively engaging said guide slot and said support arm, such that said support arm is securable thereby in a selected orientation in any of a plurality of positions along said guide slot; and (e) means for detachably securing a cutting implement to a portion of the main cutter arm overlying the rotatable table, with said cutter arm including a slotted surface therein, and said means for detachably securing a cutting implement to said main cutter arm comprising a mounting plate which is detachably securable to said cutter arm in a position overlying said slotted surface to clamp the cutting implement therebetween.

* * * * *

UNITED STATES PATENT AND TRADEMARK OFFICE
CERTIFICATE OF CORRECTION

PATENT NO. : 5,044,245

DATED : September 3, 1991

INVENTOR(S) : Daniel Molleker and David H. Klempel

It is certified that error appears in the above-identified patent and that said Letters Patent is hereby corrected as shown below:

```
Column 3, line 40, after "means", insert --.--
Column 4, line 2, change "3$" to --35--.
Column 4, line 21, change "ar" to --arm--.
Column 4, line 33, change "$" to --5--.
Column 4, line 56, change "2$" to --25--.
Column 6, line 3, after "2" insert --,--.
In the Abstract, in line 18 thereof, change "can" to --cam--.
```

Signed and Sealed this

Ninth Day of February, 1993

Attest:

STEPHEN G. KUNIN

*Attesting Officer*    Acting Commissioner of Patents and Trademarks